US 7,665,993 B2

(12) United States Patent
Genevie

(10) Patent No.: US 7,665,993 B2
(45) Date of Patent: Feb. 23, 2010

(54) SYSTEMS AND METHODS FOR CONDUCTING JURY RESEARCH AND TRAINING FOR ESTIMATING PUNITIVE DAMAGES

(76) Inventor: Louis Genevie, 340 W. 57th St., Suite 2A, New York, NY (US) 10019

( * ) Notice: Subject to any disclaimer, the term of this patent is extended or adjusted under 35 U.S.C. 154(b) by 1059 days.

(21) Appl. No.: 10/787,682

(22) Filed: Feb. 25, 2004

(65) Prior Publication Data

US 2005/0187813 A1 Aug. 25, 2005

(51) Int. Cl.
*G09B 19/00* (2006.01)
(52) U.S. Cl. ...................................... 434/235
(58) Field of Classification Search ............... 705/35; 434/235, 236

See application file for complete search history.

(56) References Cited

U.S. PATENT DOCUMENTS

| | | | |
|---|---|---|---|
| 5,444,615 A | 8/1995 | Bennett et al. | 364/401 |
| 5,815,392 A | 9/1998 | Bennett et al. | 364/401 |
| 5,875,431 A * | 2/1999 | Heckman et al. | 705/7 |
| 5,940,800 A | 8/1999 | Bennett et al. | 705/1 |
| 6,091,408 A | 7/2000 | Treibitz et al. | 345/329 |
| 6,125,340 A | 9/2000 | Miles | 702/181 |
| 6,205,323 B1 | 3/2001 | Mayo, Jr. | 455/38.2 |
| 6,607,389 B2 | 8/2003 | Genevie | 434/235 |

(Continued)

FOREIGN PATENT DOCUMENTS

WO WO 01/43050 A1 6/2001

OTHER PUBLICATIONS

The impact of Jury Instructions on the Fusion of Liability and Compensatory Damages by Wissler, Rector and Saks (Law and Humamn Behavior, vol. 25, No. 2, 2001).*

(Continued)

*Primary Examiner*—Hani Kazimi
*Assistant Examiner*—John A Anderson
(74) *Attorney, Agent, or Firm*—Fitzpatrick, Cella, Harper & Scinto

(57) ABSTRACT

The present invention relates to systems and methods for determining accurate estimates of punitive damages in bifurcated cases. The method increases the accuracy of punitive damages predictions through the use of mock juries that have completed the liability phase of the mock trial and have found the defendant liable. Prior art methods of estimating punitive damages typically skip the liability phase of the trial and ask jurors to simply assume liability, an assumption that ignores the fact that the experience of going through the process of finding the defendant liable changes the nature and dynamic of the jury in a fundamental and unpredictable manner. The method provided takes the totality of that experience into account, including the perceptions, coalitions, and antagonisms that develop during liability deliberations. The method includes assembling a pool of jurors, presenting the liability case, and assessing the results to determine whether each of the jurors is plaintiff-oriented or defendant-oriented. Based on these data, a punitive damages research jury is assembled from the pool, and this research jury deliberates the liability case to a verdict. The damages case is then presented to a research jury which has found for the plaintiff, after which the research jury hears the punitive damages case and deliberates to reach a decision on the amount of punitive damages.

29 Claims, 7 Drawing Sheets

U.S. PATENT DOCUMENTS

| | | | |
|---|---|---|---|
| 2001/0053967 A1 | 12/2001 | Gordon et al. | 703/22 |
| 2003/0018520 A1 | 1/2003 | Rosen | 705/12 |
| 2004/0002044 A1 | 1/2004 | Genevie | 434/235 |
| 2004/0054546 A1* | 3/2004 | Levin et al. | 705/1 |
| 2007/0048703 A1* | 3/2007 | Rosen | 434/235 |

OTHER PUBLICATIONS

Gobert, James J. et al., "Jury Selection: The Law, Art, and Science of Selecting a Jury", Second Edition, Shepard's/McGraw-Hill, Inc., pp. 128-140.

* cited by examiner

SYSTEMS AND METHODS FOR CONDUCTING JURY RESEARCH AND TRAINING FOR ESTIMATING PUNITIVE DAMAGES

BACKGROUND OF THE INVENTION

1. Field of the Invention

The present invention relates to systems and methods, including computer systems and methods, for conducting jury research. More specifically, the present invention relates to systems and methods for determining accurate estimates of damages, especially punitive damages, in bifurcated cases. The invention also relates to training jury consultants and researchers in how to assemble research juries for hearing bifurcated punitive damages cases so as to produce more accurate damages estimates.

2. Description of Related Art

Over the years, jury consultants have played an increasingly important role in developing strategies and tactics for both civil and criminal litigations. Speaking generally, jury consultants assist attorneys by identifying and applying information concerning the beliefs, attitudes and characteristics of potential jurors. Conventional services provided by jury consultants include focus groups, mock trials, opening statement consultations, community attitude surveys, graphics support, witness assessment preparation and the like. In essence, the jury consultant serves as an interface between the attorney and the jury pool, assisting the attorney by making recommendations for communicating his case in a persuasive and effective manner.

Conventional methods employed by jury consultants tend to focus on strategy development, and statistical analyses that attempt to model plaintiff and defense juror types. For example, in a conventional mock trial exercise, the jury consultant attempts to construct a jury that is a random and representative sample of the overall jury pool in the relevant area (a "representative jury"). The construction of such a representative jury often begins with a telephone survey, in which a statistically significant sample of the community in which the case is to be tried is questioned, to determine its attitude patterns and demographic make-up. Depending on the specific nature of the case, the survey may focus on a variety of factors, including marital status, occupation, membership in community groups and the like, as well as other factors more specifically related to the particular case. The jury consultant then makes an effort to construct a representative jury that mirrors that community's profile.

A mock trial may then be conducted before the representative jury, in which both the plaintiff's (or prosecutor's) and defendant's sides of the case are presented. Following the mock trial, the representative jury deliberates and renders a verdict. In civil litigation involving punitive damages, the jury also deliberates and renders a decision on the amount of the damage award. Each member of the representative jury is then polled and interviewed, to elicit his or her reactions to what was presented. The jury consultant compiles and analyzes the data from such interviews and makes recommendations to the attorney concerning the manner in which the case may be most effectively presented. Data concerning biases and characteristics of jurors that may help or hurt the case is also analyzed.

Over the long run, the statistical data obtained using the representative jury approach described above may prove useful, and conventional jury research has in fact provided valuable and necessary services to attorneys trying cases. However, even the strongest correlation between jurors' decision making and various aspects of their background, attitudes and experiences provides nothing more than probabilities, and falls short when tested against the complexity of actual litigation. This drawback is even more acute when one considers that it is individuals who do not think like everyone else, and therefore do not conform to the probability data, who tend to become leaders in jury deliberations.

The shortcomings of these conventional mock trial practices are particularly acute for jury research relating to civil litigation with bifurcated punitive damages proceedings. At an actual trial, the jury initially hears only the liability evidence and deliberates only the liability issues. If the jury returns a liability finding along with a finding that the plaintiff is entitled to punitive damages, then the jurors are presented with punitive damage evidence, after which they return to the jury room for deliberations on the amount of punitive damages that should be awarded. Conventional jury research methodologies in such cases have limited validity, because they do not take into account the effect of the jury deliberations that led to the liability verdict on individual jurors or on the nature and dynamic of the group. This generally is not a problem in unitary cases in which jurors hear liability and punitive damage evidence at the same time and then deliberate all the issues simultaneously. In bifurcated cases, however, this is a substantial drawback, because, jurors form perception-changing coalitions and develop antagonisms during liability deliberations that affect what happens in the punitive damages phase of the trial.

Jury researchers have approached this problem by either ignoring the bifurcation and designing the jury research as if the case was going to be tried in a unitary manner or by asking mock jurors to assume a liability finding and hear only a punitive damage case. However, liability deliberations in unitary cases are very different than bifurcated cases, because plaintiff and defense jurors can, among other things, negotiate an agreement that involves accepting liability in return for no punitive damages. This end game strategy in deliberations is not available to jurors in bifurcated cases. The group dynamic in unitary cases is also different than bifurcated cases, as the jury hears all the evidence related to the defendant's bad conduct before it has found the defendant liable, which may increase the chances for a liability finding. Likewise, simply asking jurors to assume a finding of liability and to decide the punitive damages issue based on that assumption ignores the inability of the average juror to create such a mindset. Clearly it is difficult, if not impossible, for the average juror to mentally create a unique experience he or she has not had, and then react to it as though it had actually occurred. Thus, neither of these methods captures the essence of the cognitive process by which juries award punitive damages and are therefore likely to produce unreliable and inaccurate findings.

There is a need, therefore, for systems and methods that provide valid and reliable findings from jury research on punitive damages in bifurcated cases by taking the entire process the jury goes through into account, including the formation of perceptions, coalitions and antagonisms that develop during liability deliberations.

SUMMARY OF THE INVENTION

It is an object of the present invention to provide systems and methods for determining accurate estimates of punitive damages in bifurcated cases.

It is another object of the present invention to provide systems and methods for providing corporate and trial counsel with more accurate punitive damage estimates.

It is another object of the present invention to provide systems and methods for training and educating a jury consultant or other researcher in how to assemble research juries for hearing bifurcated punitive damages cases, so as to produce more accurate damages estimates.

It is another object of the present invention to provide systems and methods in which mock trial exercises for bifurcated punitive damages cases are conducted before a research jury in a manner that more closely resembles the way an actual jury will hear the case.

It is another object of the present invention to provide jury consulting and research methodologies that yield greater accuracy in damages predictions, and a better understanding of the interpersonal dynamics the actual jury will experience in a bifurcated damages case.

It is another object of the present invention to present damages evidence to a research jury within the context of both their preexisting biases and a new and unpredictable set of relationships that did not exist prior to deliberation of the liability evidence.

It is yet another object of the present invention to assemble research juries that provide an intense clash of the issues in the case, creating a better understanding of how deliberation of the liability issues affects the damages decision.

In one aspect, the present invention provides a method for conducting jury research. The method includes presenting the liability case to the initial pool of jurors. Pre-deliberation questioning of the initial pool of jurors is conducted regarding their reaction to the liability case using individual questionnaires, and the results of this questioning are analyzed. A research jury is assembled from members of the initial pool of jurors, and the research jury is asked to deliberate the liability case. The damages case is then presented to the research jury, and the research jury is allowed to deliberate the damages case to reach a damages decision.

Embodiments of the present invention may include one or more of the following features. The research jury may be assembled based on the analysis of the results of the post-liability deliberation questioning. The research jury may be assembled to have at least one defendant-oriented juror and to have more plaintiff-oriented jurors than defendant-oriented jurors. Post-deliberation questioning of the research jury may be conducted following the deliberation of the liability case, and the results of this questioning may be analyzed. Post-deliberation questioning of the research jury may be conducted following the deliberation of the damages case, and the results of this questioning may be analyzed. A damages estimate may be determined based on the damages decisions of a number of research juries. The damages estimate may be determined by taking an average of the damages decisions of the research juries or jurors.

In another aspect, the present invention provides a method and computer code for conducting jury research. The method includes receiving juror data for an initial pool of jurors. The method also includes receiving juror pre-deliberation response data resulting from questioning of the initial pool after the liability case has been presented and before deliberation of the liability portion. A determination is made as to whether each of the jurors is plaintiff-oriented or defendant-oriented based on analysis of the results of the post liability phase questioning. A research jury is defined from members of the initial pool of jurors, and the research jury has at least one defendant-oriented juror and has more plaintiff-oriented jurors than defendant-oriented jurors.

Embodiments of the present invention may include one or more of the following features. Damages verdict data may be received from each research jury following deliberation of the liability case, presentation of the damages case, and deliberation of the damages case. The determination of whether each juror is plaintiff-oriented or defendant-oriented may include computer analysis of the juror post liability phase response data or analysis of the juror pre-liability phase data by a user. The definition of the research jury may include computer selection of research jury members using predetermined criteria or selection of research jury members by a user.

In another aspect, the present invention provides a system and computer code for conducting jury research. The system includes a database server configured to store juror data for an initial pool of jurors and juror post liability phase response data resulting from questioning of the initial pool after the liability case has been presented and before deliberation of the liability case. The system further includes a client computer configured to determine whether each of the jurors is plaintiff-oriented or defendant-oriented based on analysis of the results of the pre-deliberation questioning. The client computer defines a research jury composed of members of the initial pool of jurors. The research jury has at least one defendant-oriented juror and has more plaintiff-oriented jurors than defendant-oriented jurors.

Embodiments of the present invention may include the feature that the client computer is connected to the database server via a Web server.

DETAILED DESCRIPTION OF THE PREFERRED EMBODIMENTS

Figure 1:
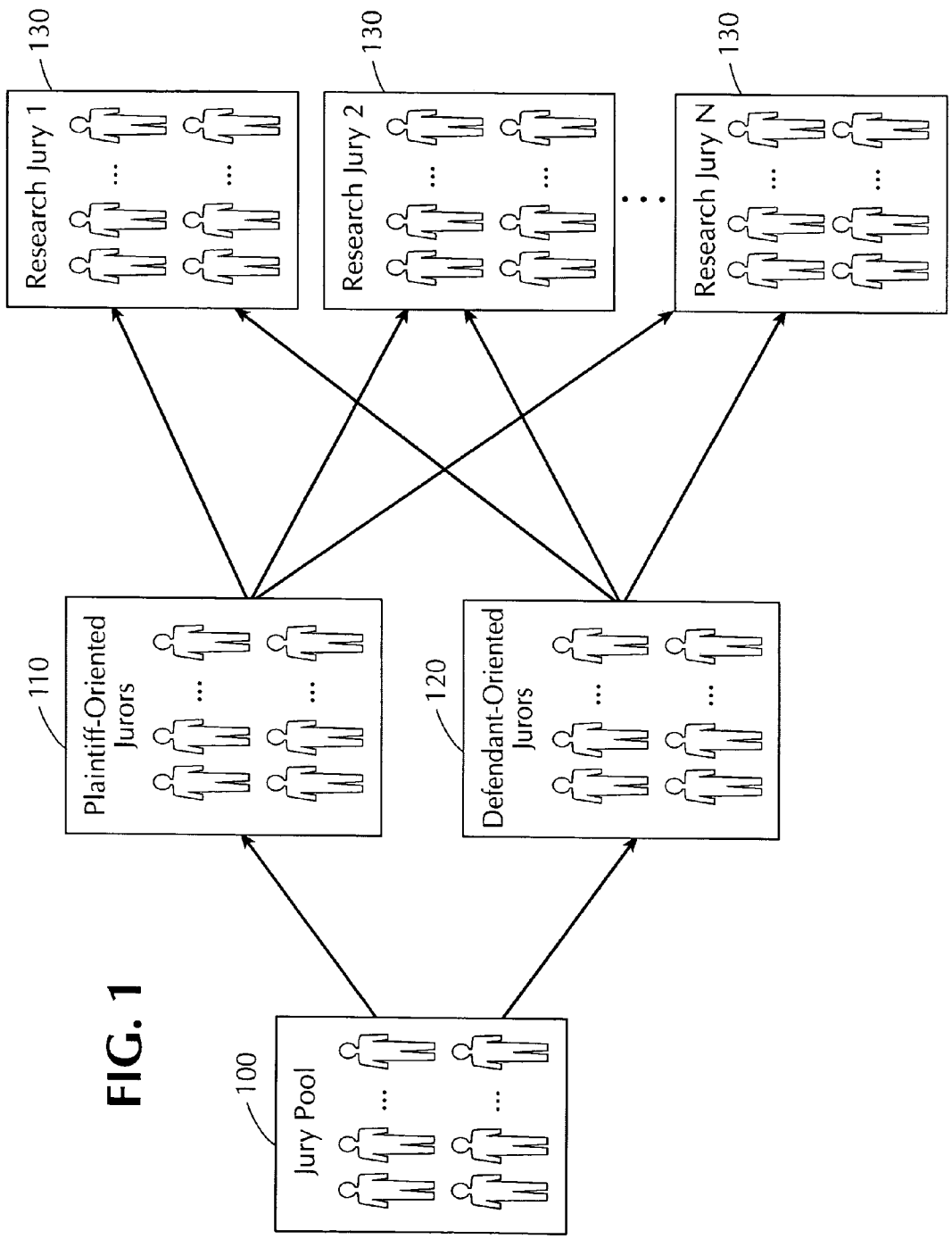
FIG. 1 is a block diagram illustrating the formation from a jury pool of punitive damages research juries including plaintiff-oriented and defendant-oriented jurors.

The current invention addresses the problems discussed above by recreating the complete process by which a jury decides to award punitive damages in a bifurcated civil litigation.

As used herein, the term "computer" may refer to a single computer or to a system of interacting computers. Generally speaking, a computer is a combination of a hardware system, a software operating system and perhaps one or more software application programs. Examples of computers include, without limitation, IBM-type personal computers (PCs) having an operating system such as DOS, Windows, OS/2 or Linux; Macintosh computers; hardware having a JAVA-OS operating system; graphical work stations, such as Sun Microsystems and Silicon Graphics Workstations having a UNIX operating system; PalmPilots; and Pocket PCs.

"Network" means a connection between any two or more computers, which permits the transmission of data. An example of a network, although it is by no means the only example, is the Internet.

"Web page" means any documents written in mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web site" means at least one Web page, and more commonly a plurality of Web pages, virtually connected to form a coherent group.

"Web browser" means any software program that can display text, graphics, or both, from Web pages on Web sites. Examples of Web browsers include, without limitation, Netscape Navigator and Microsoft Internet Explorer.

"Web server" refers to a computer or other electronic device that is capable of serving at least one Web page to a Web browser.

The phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, C, C++, CGI, Java and Java Scripts. Furthermore, the functions of the present invention, when described as a series of steps for a method, could be implemented as a series of software instructions for being operated by a data processor, such that the present invention could be implemented as software, firmware or hardware, or a combination thereof.

In general, the present invention involves the creation of juries for research relating to civil litigation that is bifurcated into a liability proceeding and a damages proceeding. As shown in FIG. 1, a jury pool 100 is assembled to hear the liability case, either in summary form or as a complete trial simulation. The jury pool 100 then is divided into plaintiff-oriented jurors 110 and defendant-oriented jurors 120 by a researcher based on the results of a pre-deliberation questionnaire and other information relating to the jurors and their attitudes regarding the case. The plaintiff-oriented jurors 110 and defendant-oriented jurors 120 are in turn used to create one or more research juries 130 to which the damages case is presented, and the results of their damages decisions are analyzed. The details of this process are further discussed below.

The jury pool 110 should provide a representative sample of the community in which the case is tried, such that it mirrors the actual jury pool as closely as possible. Thus, those who are disqualified from jury service, such as for example minors, should not be included in the jury pool. Also, if there are certain groups in the community who are permitted to and do routinely exempt themselves from service, such as for example doctors, lawyers and police officers, then no such individuals should be allowed in the jury pool. Speaking generally, the jury pool may be collected in the same manner in which the representative juries used in conventional jury consulting methodologies are obtained, taking into account demographic considerations and the like. The number of people needed for the jury pool varies depending on such factors as: the number of research juries desired; the number of jurors in each research jury; and the ratio of plaintiff-oriented jurors to defense-oriented jurors in the jury pool.

In one advantageous aspect of the present invention, a computer system running software applications is provided so that the researcher (generally hereinafter referred to as a "user") can access juror profile information, such as name and basic demographics, and the information gathered from the jurors during the research process, such as responses to the various questionnaires and interviews, as well as video or transcripts made during deliberations. After reviewing the relevant information, the user can then use the software to divide the juror pool 100 into a series of research juries 130, and the make-up of these research juries 130 can be reviewed, stored, and changed as necessary until a final desired configuration is achieved.

Figure 2:
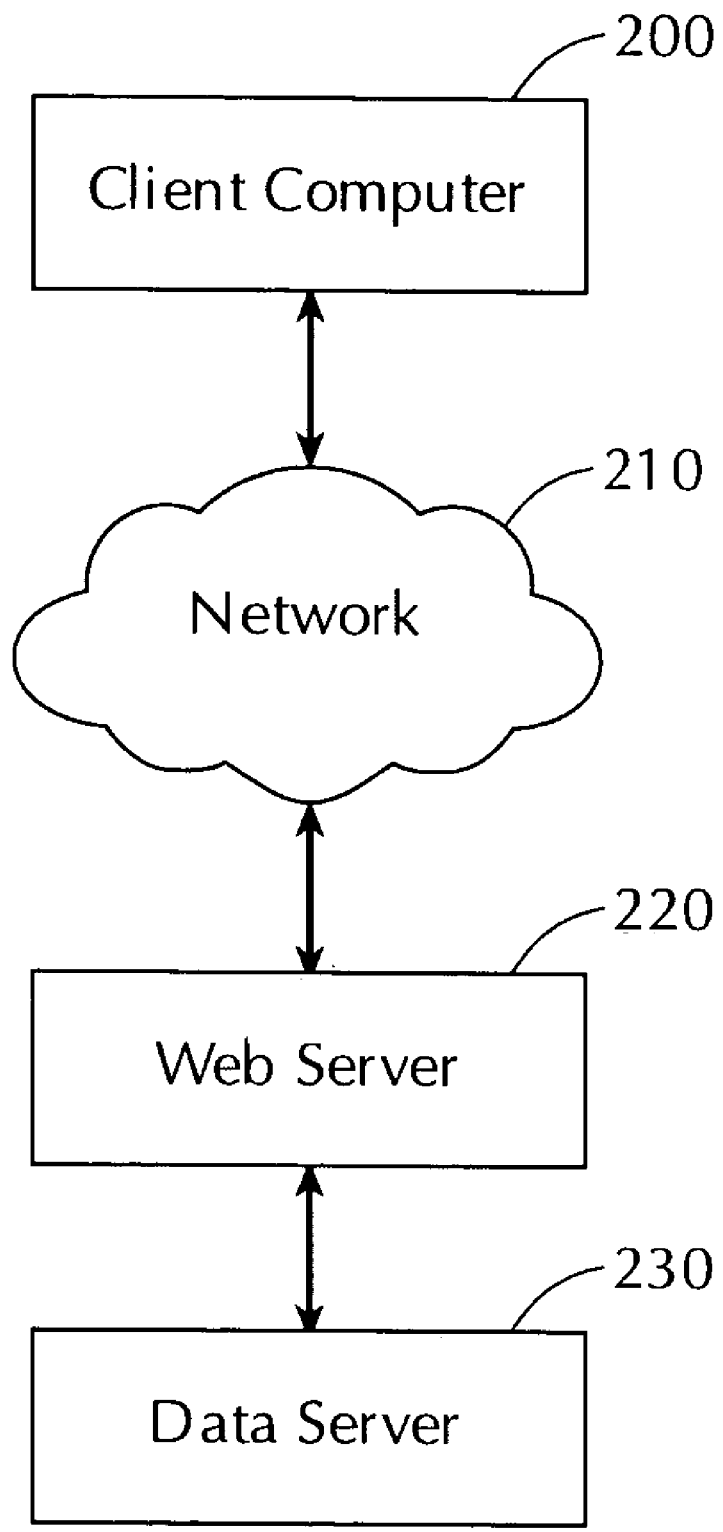
FIG. 2 is a block diagram of an example of a computer system that may be used to implement the present invention.

An example of this aspect of the present invention is depicted schematically in FIG. 2. The system includes a client computer 200 (for example a personal computer), which may run the software of the present invention independently and provide storage for all of the juror profile information and other data. Alternatively, in the configuration shown, the client computer 200 is connected to a network 210, which may be, for example, the Internet. In such a case, the client computer 200 interacts via the network 210 with a Web server 220, which in turn may be connected to a database server 230.

In the configuration of FIG. 2, the Web server 220 and/or a database server 230 store and/or run the software and data necessary for the implementation of the present invention. The database server 230 may comprise a relational database management system, in which stored information is arranged in tables of rows and columns (or in records having defined fields), related to one another by predetermined functions, and can be accessed by database query protocols, such as the Structural Query Language (SQL). Other configurations are possible as well.

The client computer 200 preferably includes communications hardware and an operating system with graphical user interface (GUI) functionality to allow for interface with the Internet, and is preferably equipped with graphical World Wide Web (Web) browser software, such as Netscape Navigator or Microsoft Internet Explorer, loaded thereon and operable to read and send Hypertext Markup Language (HTML) forms from and to a Hypertext Transport Protocol (HTTP) server on the Web. Preferably, the client computer 200 is operable to act as a virtual machine to run Java applets, or the like, downloaded by the browser from the server. The Web server 220 preferably includes hardware, HTTP compliant software, an operating system and common gateway interface (CGI) software for interfacing with input queries and sources of data. The Web server 220, running software in accordance with the present invention and interacting with data stored in the database server 230, is accessed by the client computer 200, thereby allowing the researcher to access and manipulate juror data.

It will be readily appreciated that the schematic of FIG. 2 is exemplary only, and that numerous variations are plainly possible. For example, each of the computers 200 and 220 may be connected to their own network, which networks in turn are connected to the network 210. The system may also be implemented with multiple client computers and multiple Web servers. Also, the network 210 may be a local area network (LAN), and metropolitan area network (MAN) or a wide area network (WAN) other than the Internet. As discussed above, the invention may be implemented without client-server architecture and/or without any network at all; instead, all software and data necessary for the practice of the present invention may be stored on storage device (such as, for example, a CD-ROM), which is accessed locally by a user's computer. Other variations exist as well.

The software is started by the user, for example by initiating execution of the software on the client computer 200 or by accessing a Web site on the Web server 220. In the latter case, the Web site may have limit access, for example by requiring a password, to allow only authorized users to access the software. Such a password protection technique may be used when the software is stored locally as well. Once the software has been started, the user is presented with an introduction sequence that provides instructions to the user on how to use the software. Experienced users may bypass the introductory material by clicking on a button or hyperlink provided for that purpose. Otherwise, the user will review the introductory material, which may be provided on a sequence of screens or Web pages that the user steps through on a screen-by-screen or page-by-page basis. There may also be video and/or audio clips or streaming video and/or audio providing detailed instructions on how to prepare for and run the software. This instructional information may have interactive capabilities to allow the user to access information relating to particular aspects or details of the software.

Figure 3:
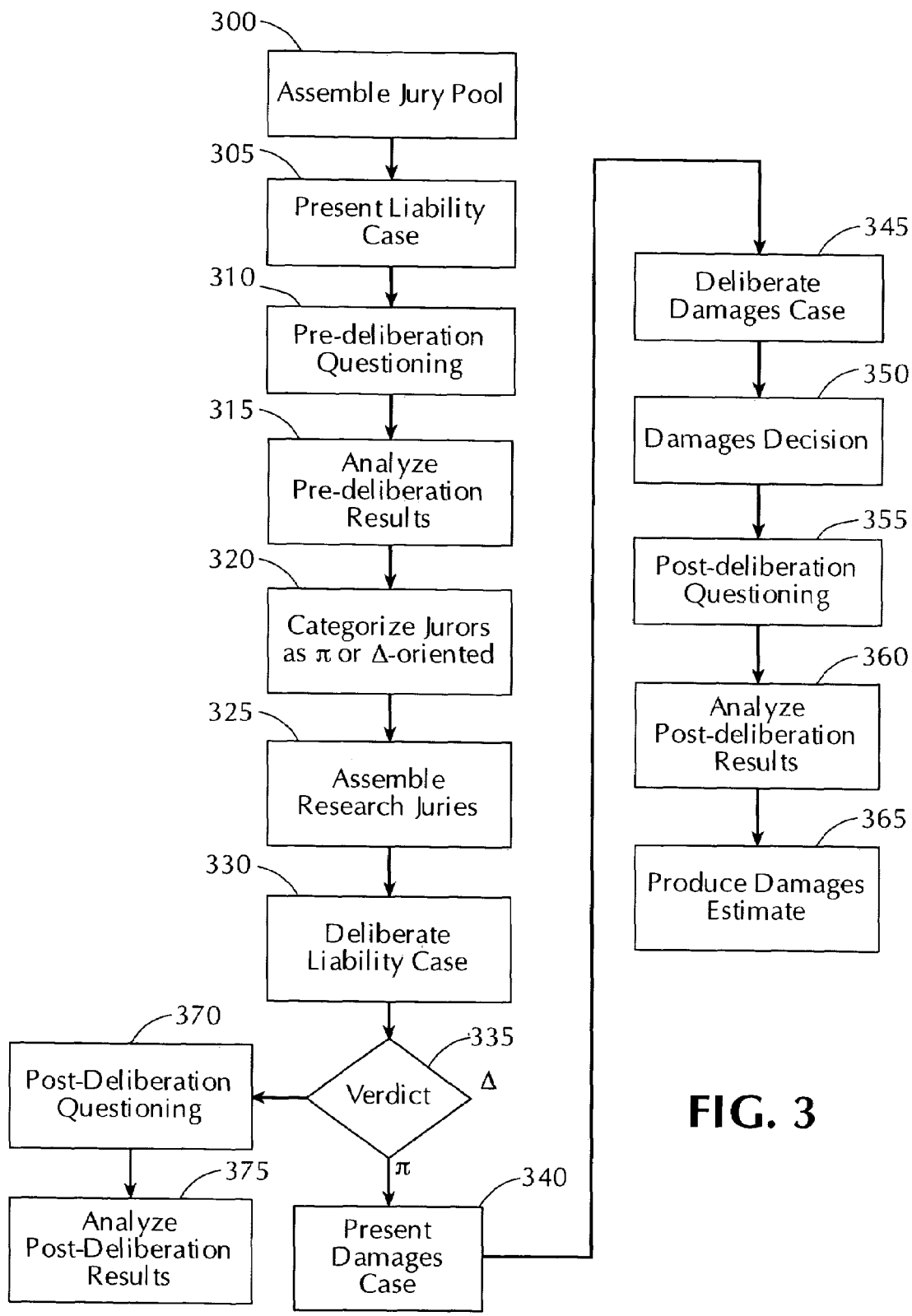
FIG. 3 is a flowchart of the procedures for creating and using punitive damages research juries.

As shown in FIG. 3, the first step in the jury research process is to assemble the jury pool (step 300), which is done in accordance with the considerations discussed above. The liability case is presented to the entire jury pool (step 305), either in summary form, or in a full-scale trial simulation. Following the presentation of the case, the jurors fill out a pre-deliberation questionnaire designed by the researcher to detail their reactions to the case (step 310). The questionnaire also asks for basic demographic information about the juror, as in the following example, and this portion of the questionnaire may be completed prior to the presentation of the liability case to assist in assembly of the jury pool:

| | |
|---|---|
| Name: | John Smith |
| Age: | 35 |
| Sex: | Male |
| Health: | Good |
| Occupation: | Doctor |
| Military Service: | Navy, 4 years |
| Education: | M.D. |
| Married: | Yes |
| Children: | 2: 3 years and 5 years |

The questions on the pre-deliberation questionnaire are based on the researcher's experience with how jurors respond to questions regarding litigation-related facts and issues and may include both direct and indirect questions in a wide variety of formats, e.g., multiple choice and free-form written answers. In addition to the pre-deliberation questionnaire data, pre-deliberation interviews may be conducted with each juror. Such interviews may be videotaped for later review by the researcher, and a transcript may be produced.

The pre-deliberation questionnaire may, for example, directly ask the jurors which side they favor and to what extent they are committed to that position. This may be done with questions such as: "At this point, which side do you favor in this lawsuit? (Plaintiff/Defendant)" and "On a scale of 1 to 9, how strong is your belief that the (plaintiff/defendant) should win this case?" More specific questions relating to the legal issues may also be used, such as: "Has the plaintiff proven by a preponderance of the evidence that the defendant failed to warn?" or "Has the plaintiff proven by a preponderance of the evidence that the defendant produced a defective product?" The strength of the juror's opinion on the legal issue may be assessed: "If so, on a scale of 1 to 9, how strongly do you hold that opinion?"

Figure 4:
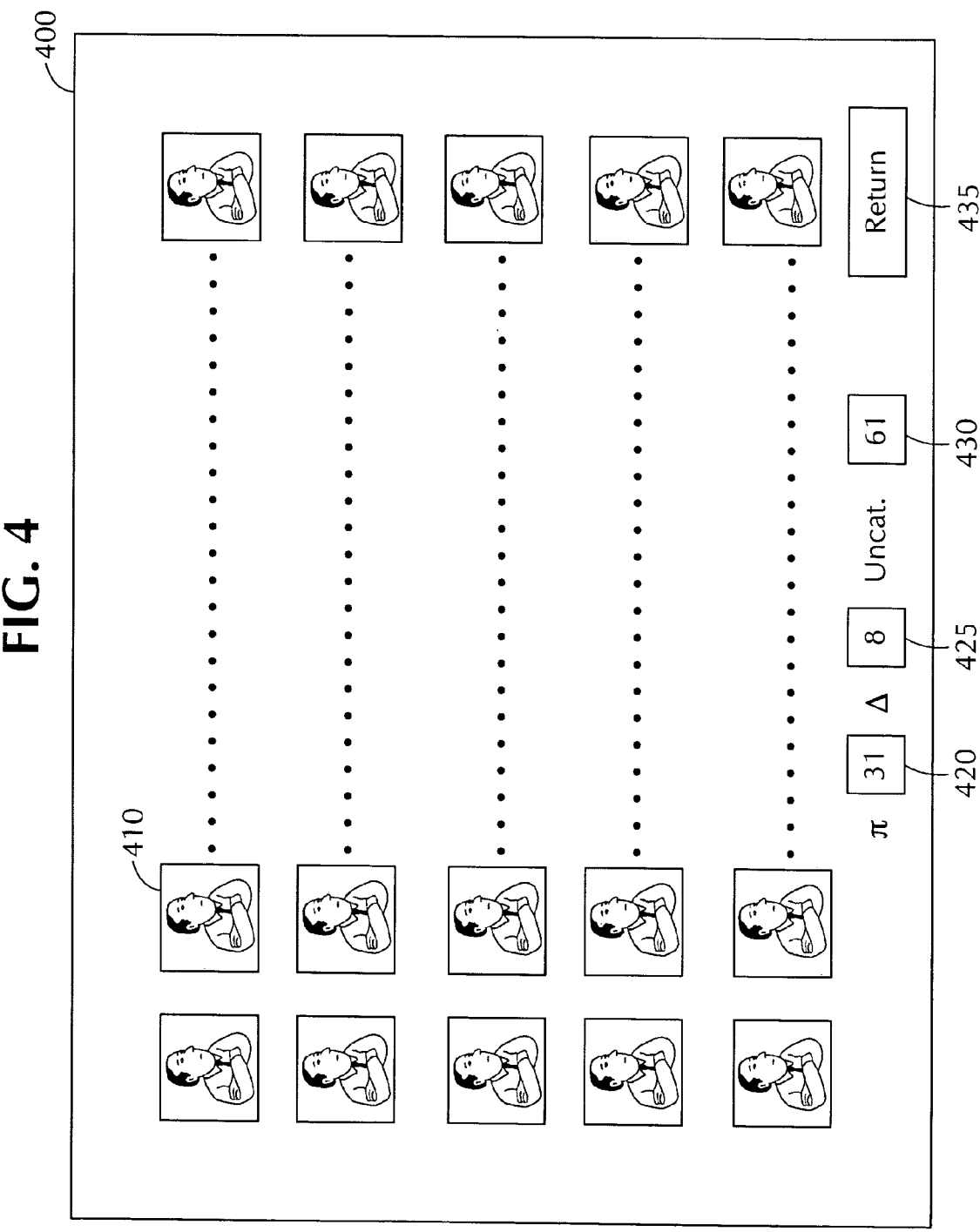
FIG. 4 is an example of a screen showing the juror pool and providing access to information relating to each juror.

Once the pre-deliberation questionnaires and interviews have been completed (step 310), the researcher is ready to begin analyzing the results (step 315) to categorize each juror as plaintiff-oriented or defendant-oriented (step 320) and assembling the research juries (step 325). As shown in FIG. 4, the initial jury pool 100 is presented on a main juror screen 400 or Web page as an array of icons 410, each of which represents a potential juror. The icons 410 may be for example images of the individual members of the jury pool 100. The screen 400 may display the total number of plaintiff-oriented jurors 420, defendant-oriented jurors 425, and uncategorized jurors 430. The screen also may have button 435 or link to return to a previous screen. The screen also may provide a preview frame (not shown) which may present more detailed information for a potential juror as the user moves a pointing device over that juror's icon. Alternatively, the detailed information may appear as a floating frame positioned over a portion screen some distance away from the juror icon in question.

Figure 5:
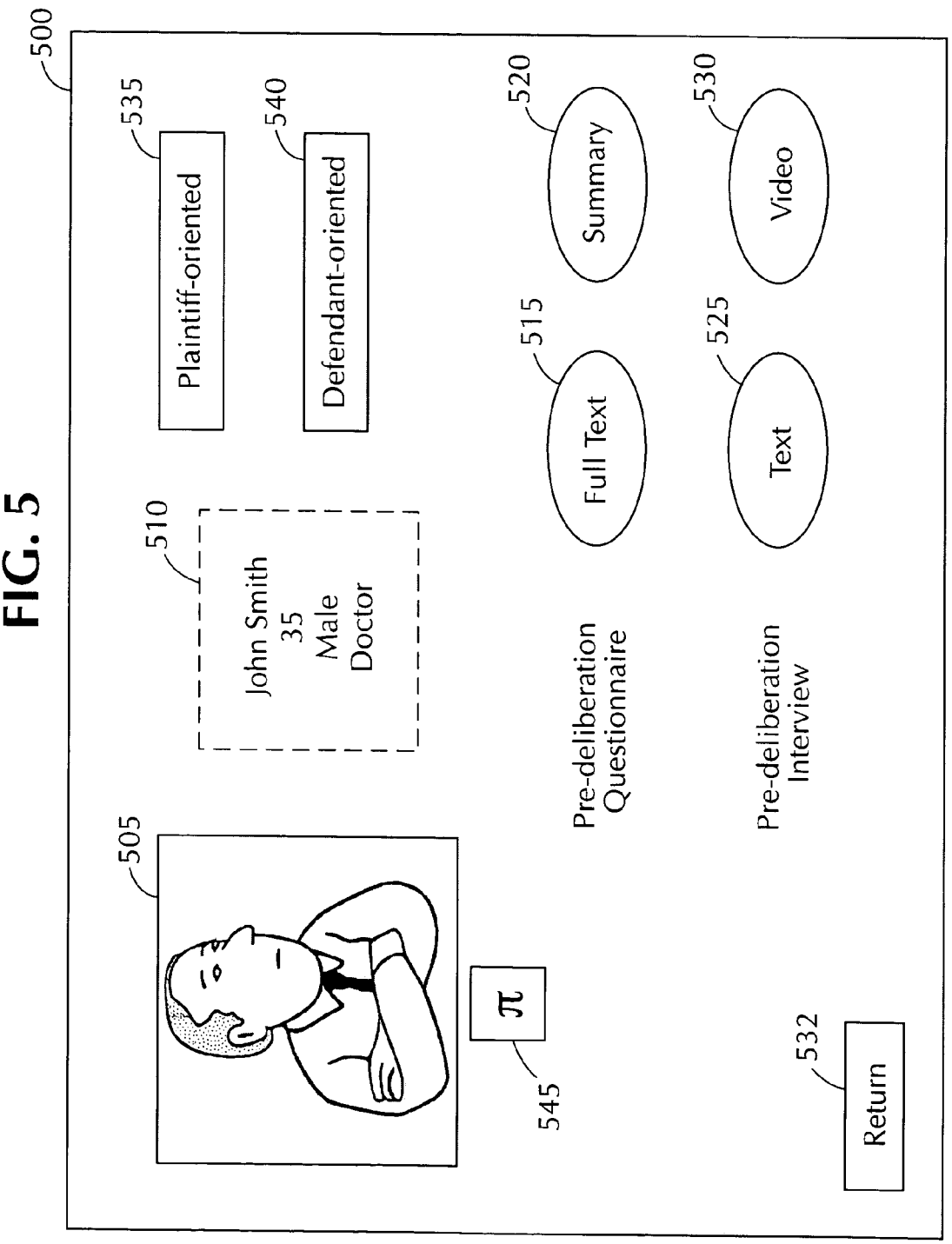
FIG. 5 is an example of a profile screen for an individual juror.

Each juror icon 410 acts as a button or link to allow the user to access the respective juror's profile screen 500, as shown in FIG. 5. The profile screen 500 provides information about the juror, such as an image 505 and name and basic demographic information 510 (e.g., name, age, sex, and occupation). The screen 500 also provides access to the juror's pre-deliberation questionnaire responses through a button or link to the full text 515 or a summary 520 and to the juror's pre-deliberation interview through a button or link to the text 525 or a video recording 530. A "Return" button 532 or link may be provided to return to the main juror screen 400. In a Web site configuration, the video recording may be downloaded or streamed in any of a variety of known fashions.

The researcher analyzes the pre-deliberation questionnaire results and other data, e.g., a pre-deliberation interview, and categorizes the juror as plaintiff-oriented or defendant-oriented (see FIG. 3, step 320) using buttons or links 535 and 540 provided on the profile screen 500. An indicator 545 or symbol (e.g., π or Δ) may appear near the juror's image 505 to indicate the juror's orientation. Alternatively, other types of indicators may be used, such as a color-coded frame around the juror's image 505. In addition, the plaintiff-oriented 535 or defendant-oriented 540 button may be highlighted, color-coded or represented as a depressed button to indicate which orientation has been selected.

As discussed above, the designation of the juror as plaintiff-oriented or defendant-oriented is based at least in part on the answers provided by the jurors on the questionnaire, as interpreted by the researcher. The questionnaires may be interpreted in a number of ways. For example, the multiple choice, yes/no, and scored (e.g., on a scale of 1 to 9 . . . ) responses may be entered or electronically input into a computer having software programmed to compute an overall rating for the juror based on these responses. The overall rating may be an average or a weighted average of the responses to the various questions. Greater weight may be given to the responses to questions that are more general, such as "which side do you favor?" whereas less weight may be given to the responses to questions that relate to specific or subsidiary issues. The ratings provided by the computer may be combined with manual analysis performed by the researcher, such as the evaluation of essay answers. While there is no certainty as to how a juror eventually will decide after deliberations, the present invention helps the researcher to determine within a reasonable level of certainty the party each juror favors and the relative strength of the juror's leanings.

A number of research juries are assembled based on the juror designations determined above. To provide the best results, the research juries should be composed primarily of plaintiff-oriented jurors and have a varying number of defendant-oriented jurors. In general, the number of defendant-oriented jurors should not be large enough to tip the scale toward the defendant, but should be sufficient to provoke discussion in the jury room very much like that which would occur if the jury were overwhelmingly, but not exclusively, plaintiff-oriented. The strength of each juror's leanings toward plaintiff or defendant should also be taken into account in forming the research juries, again with the purpose of structuring a discussion in the liability deliberations very much like that which would occur if the defendant were to lose the support of the majority of jurors during the trial.

Thus, if each research jury has six members, then one, two, or possibly three, defendant-oriented jurors may be assigned to a jury, depending upon the relative strength of the leanings of the particular jurors. Preferably, the jurors will be divided so that there are varying numbers of defendant-oriented jurors on each research jury, but generally there will be at least one on each research jury. The assembly of the research juries may be done by the computer, the researcher or some combination of the two. The goal is to create a strong discussion of the liability issues that ultimately results in a plaintiff verdict on both liability, compensatory damages, and the need for punitive damages.

For example, the computer may divide the jury pool based on the pre-deliberation questionnaire results, which, as discussed above, may be based on a combination of computer scoring and manual evaluation of questionnaire answers. This division of the jury pool may be subsequently modified by the researcher based on the researcher's evaluation of the juror profile data, questionnaire data, and other data, in light of the researcher's experience. Alternatively, the assembly of the research juries may be an entirely manual process performed by the researcher. As discussed below, the software of the present invention may provide tools for assisting the researcher in assembling the research juries, whether the process is done manually or using some combination of computer and manual processes.

Figure 6:
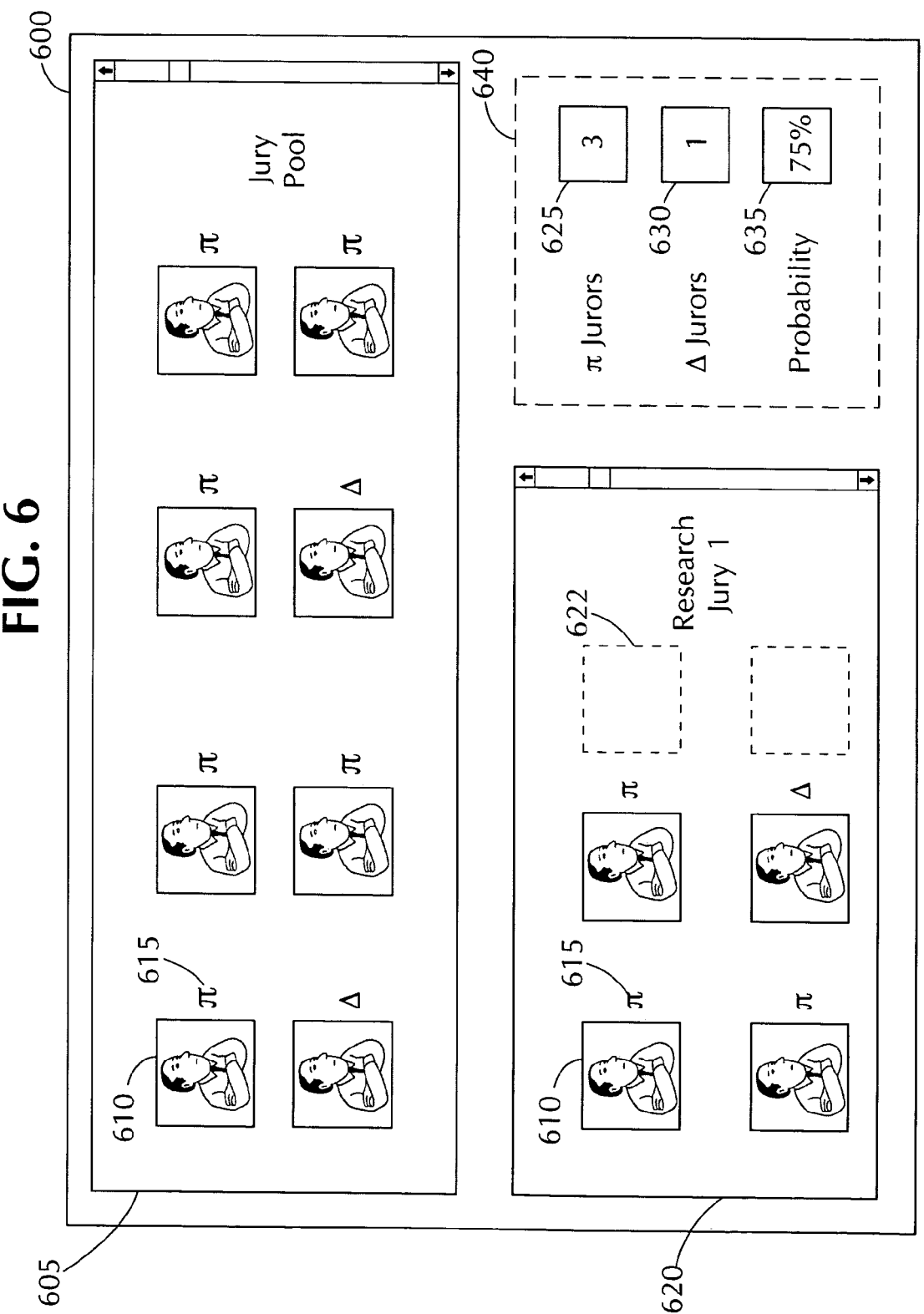
FIG. 6 is an example of a research jury selection screen.

FIG. 6 shows an example of a research jury assembly screen 600 that may be provided to allow the researcher to select jurors for the research juries. The assembly screen 600 displays the jury pool 100 in a top section 605 using image icons 610, as in the main juror screen 400 (see FIG. 4), including an indicator 615 as to whether each juror is plaintiff-oriented or defendant-oriented. The bottom section 620 displays the research juries as a series of icon 610 groups, and the user may view the individual juries by scrolling through the groups. Open positions on each jury may be indicated by a blank space or other indicator, such as a square 622 having a dashed or color-coded outline.

The user may select a particular juror for a research jury by, for example, dragging the corresponding icon 610 from the top section 605 into the bottom section 620. The user also may select a particular juror and review that juror's profile screen 500 (see FIG. 5) by, for example, double-clicking on the corresponding icon 610. Status information, such as the number of plaintiff-oriented 625 and defendant-oriented 630 jurors on the research jury currently being assembled and a computed probability 635 that the research jury will find for the plaintiff, may be displayed in a status portion 640 of the screen 600. The user may set certain parameters, such as the number of jurors on each research jury (six in this example) and the number of research juries, using a settings selection screen (not shown).

Referring again to FIG. 3, once the research juries have been assembled (step 325), any unselected jurors in the jury pool are dismissed and the juries deliberate the liability issues that were presented earlier (step 330). During these deliberations, the jurors' interactions with one another create relationships and possibly create positive or negative alliances. These relationships have a strong impact on subsequent punitive damage deliberations and must be developed in real time in order to create valid and reliable punitive damage findings.

Following deliberations, each research jury reaches a verdict (step 335). Most, but not all of the punitive damage juries, will find for the plaintiff, and in the process create a certain interpersonal dynamic, a personal history with one another. The juries finding for the plaintiff will then hear punitive damage evidence (step 340), deliberate the damages case (step 345), and render a damages decision (step 350). Thus, the damages evidence, usually detrimental to the defense, is presented to the punitive damage juries within the context of not only their preexisting biases, but also a new and unpredictable preexisting set of relationships that did not exist prior to trial. It is the incorporation of that dynamic, along with the alliances arising from the deliberation of liability, which provides the present invention with a significant advantage over conventional techniques in determining accurate estimates of punitive damages in bifurcated cases.

Following the damages decisions, the jurors undergo post-deliberation questioning (step 355), which is preferably done using a questionnaire, and the resulting information is analyzed by the researcher (step 360). A final damages estimate is then produced based on the decisions reached by the research juries (step 365). The estimate may be generated by the computer, e.g., by computing an average of the decisions reached by the research juries, or by a combination of computer and manual processing.

For example, the researcher may use the post-deliberation data to evaluate the damages decisions reached by the various research juries. If the researcher determines that certain anomalous events took place during the deliberations of a particular research jury, or if the researcher determines that, based on experience, a particular research jury does not seem to be representative of an actual jury, then the damages decision reached by that jury may be excluded from the calculation of the final damages estimate (step 365). In addition, the post-deliberation data serves as a training tool to educate the researcher regarding the inter-personal dynamics that develop during punitive damages deliberations. This, in turn, will help the researcher develop a more finely tuned sense of how jurors make damages decisions. Armed with such experience, the researcher can more accurately synthesize the results of the various research juries to achieve a more accurate overall damages estimate.

Although most research juries will find for the plaintiff, occasionally a jury may find for the defendant. In such cases, the jurors will undergo post-deliberation questioning (step 370), and the resulting data will be analyzed by the researcher (step 375) to help avoid such occurrences in the future. In this manner, the present invention acts as a training or educational tool for the researcher, as it will help the researcher identify circumstances that may lead to improper selection of jurors for a research jury.

Figure 7:
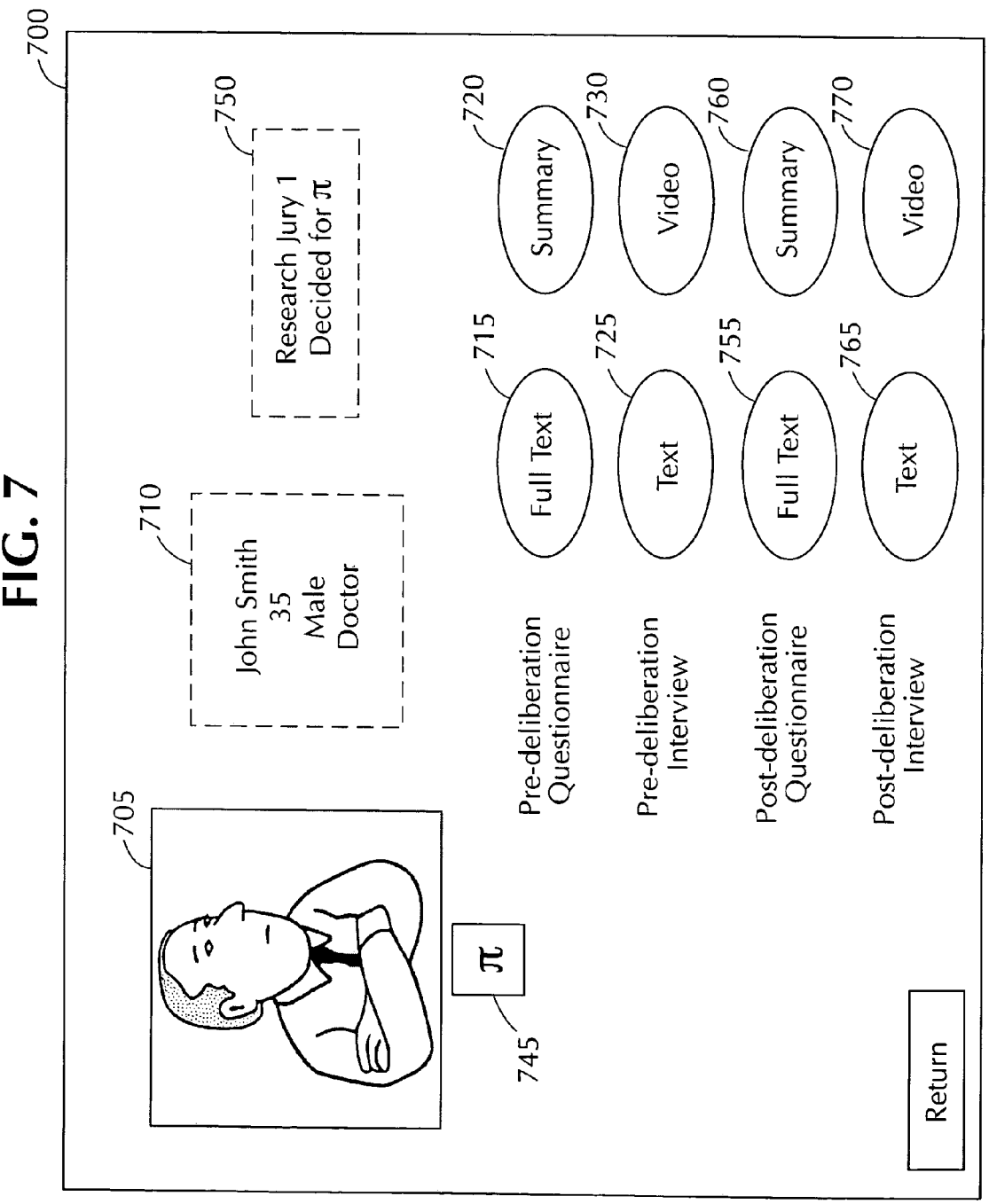
FIG. 7 is an example of a profile screen for an individual juror following liability and damages deliberations.

To assist in the post-deliberation analysis and determination of the damages estimate, the present invention may provide a post-deliberation juror profile screen, as shown in FIG. 7. The post-deliberation screen 700 is similar to the pre-deliberation profile screen 500 (see FIG. 5) in that it provides information about the juror, such as an image 705 and name and basic demographic information 710 (e.g., name, age, sex, and occupation). The screen 700 also provides access to the juror's pre-deliberation questionnaire responses through a button or link to the full text 715 or a summary 720 and to the juror's pre-deliberation interview through a button or link to the text 725 or a video recording 730. Similarly to the juror profile screen 500, an indicator 745 or symbol (e.g., π or Δ) may appear near the juror's image 705 to indicate the juror's orientation.

However, the post-deliberation profile screen 700 also includes an indication 750 of which research jury the juror was on and whether that jury decided for the plaintiff or defendant. The screen 700 also provides access to the juror's post-deliberation questionnaire responses through a button or link to the full text 755 or a summary 760 and to the juror's post-deliberation interview through a button or link to the text 765 or a video recording 770. As discussed above, the post-deliberation questionnaire and interview are ordinarily obtained following the damages deliberations, except when a research jury finds for the defendant, in which this information is obtained following the liability deliberations. By providing all of the relevant data pertaining to a particular juror on a single screen, the post-deliberation profile screen 700 helps educate the researcher regarding the relationship between juror demographics and questionnaire responses and eventual decisions made by the juror. This, in turn, will help the researcher assemble research juries in future exercises that produce more accurate damages estimates.

The foregoing detailed description is intended to be illustrative and not limiting of the present invention, which is defined by the claims set forth below.

What is claimed is:

1. A computer-implemented method of conducting jury research, the method comprising:
   presenting a liability portion of a case to the initial pool of jurors;
   conducting pre-liability-deliberation questioning of the initial pool of jurors regarding their reaction to the liability portion of the case;
   analyzing results of the pre-liability-deliberation questioning;
   assembling at least one research jury composed of members of the initial pool of jurors, wherein the at least one research jury is assembled based on the analysis of the results of the pre-liability-deliberation questioning;
   deliberating the liability portion of the case by the research jury;
   presenting a damages portion of the case to the research jury; and
   deliberating the damages portion of the case to reach a damages decision by the research jury,
   wherein at least one of the analyzing step and the assembling step is performed using a computer.

2. The method of claim 1, wherein the at least one research jury is assembled to have at least one defendant-oriented juror and to have more plaintiff-oriented jurors than defendant-oriented jurors.

3. The method of claim 1, further comprising:
   conducting post-liability-deliberation questioning of the research jury following the deliberation of the liability portion of the case; and
   analyzing results of the post-liability-deliberation questioning of the research jury.

4. The method of claim 1, further comprising:
   conducting post-damages-deliberation questioning of the research jury following the deliberation of the damages portion of the case; and
   analyzing results of the post-damages-deliberation questioning of the research jury.

5. The method of claim 1, further comprising determining a damages estimate based on the damages decisions of a plurality of research juries.

6. The method of claim 5, wherein the damages estimate is determined by taking an average of the damages decisions of the plurality of research juries.

7. A computer-implemented method of conducting jury research, the method comprising:
   receiving juror data for an initial pool of jurors;
   receiving juror pre-liability-deliberation response data resulting from questioning of the initial pool after the liability portion of the case has been presented and before deliberation of the liability portion;
   determining whether each of the jurors is plaintiff-oriented or defendant-oriented based on analysis of the results of the pre-liability-deliberation questioning; and
   defining at least one research jury composed of members of the initial pool of jurors, the at least one research jury having at least one defendant-oriented juror and having more plaintiff-oriented jurors than defendant-oriented jurors,
   wherein said defining step is performed using a computer.

8. The method of claim 7, further comprising receiving damages verdict data from each research jury following deliberation of the liability portion of the case, presentation of a damages portion of the case, and deliberation of the damages portion of the case.

9. The method of claim 7, wherein the determination of whether each juror is plaintiff-oriented or defendant-oriented comprises computer analysis of the juror pre-liability-deliberation response data.

10. The method of claim 7, wherein the determination of whether each juror is plaintiff-oriented or defendant-oriented comprises analysis of the juror pre-liability-deliberation response data by a user.

11. The method of claim 7, wherein the definition of the at least one research jury comprises computer selection of research jury members using predetermined criteria.

12. The method of claim 7, wherein the definition of the at least one research jury comprises selection of research jury members by a user.

13. A system for conducting jury research, the system comprising:
   a database server configured to store juror data for an initial pool of jurors and juror pre-liability-deliberation response data resulting from questioning of the initial pool after the liability portion of the case has been presented and before deliberation of the liability portion; and
   a client computer configured to determine whether each of the jurors is plaintiff-oriented or defendant-oriented based on analysis of the results of the pre-liability-deliberation questioning,
   wherein the client computer defines at least one research jury composed of members of the initial pool of jurors, the at least one research jury having at least one defendant-oriented juror and having more plaintiff-oriented jurors than defendant-oriented jurors.

14. The system of claim 13, wherein the determination of whether each juror is plaintiff-oriented or defendant-oriented comprises computer analysis of the juror pre-liability-deliberation response data.

15. The system of claim 13, wherein the determination of whether each juror is plaintiff-oriented or defendant-oriented comprises presentation by the client computer of the juror pre-liability-deliberation response data to a user.

16. The system of claim 13, wherein the definition of the at least one research jury comprises computer selection of research jury members using predetermined criteria.

17. The system of claim 13, wherein the definition of the at least one research jury comprises selection of research jury members by a user.

18. The system according to claim 13, wherein the client computer is connected to the database server via a Web server.

19. A computer-readable medium storing, in executable form, computer code for causing a computer to perform a method for conducting jury research, the method comprising:
  receiving juror data for an initial pool of jurors;
  receiving juror pre-liability-deliberation response data resulting from questioning of the initial pool after the liability portion of the case has been presented and before deliberation of the liability portion;
  determining whether each of the jurors is plaintiff-oriented or defendant-oriented based on analysis of the results of the pre-liability-deliberation questioning; and
  defining at least one research jury composed of members of the initial pool of jurors, the at least one research jury having at least one defendant-oriented juror and having more plaintiff-oriented jurors than defendant-oriented jurors.

20. The computer-readable medium of claim 19, wherein the method further comprises receiving damages verdict data from each research jury following deliberation of the liability portion of the case, presentation of a damages portion of the case, and deliberation of the damages portion of the case.

21. The computer-readable medium of claim 19, wherein the determining of whether each juror is plaintiff-oriented or defendant-oriented comprises computer analysis of the juror pre-liability-deliberation response data.

22. The computer-readable medium of claim 19, wherein the determining of whether each juror is plaintiff-oriented or defendant-oriented comprises analysis of the juror pre-liability-deliberation response data by a user.

23. The computer-readable medium of claim 19, wherein the defining of the at least one research jury comprises computer selection of research jury members using predetermined criteria.

24. The computer-readable medium of claim 19, wherein the defining of the at least one research jury comprises selection of research jury members by a user.

25. A computer-readable medium storing, in executable form, computer code for causing a computer to perform a method of configuring a system for conducting jury research, the method comprising:
  configuring a database server to store juror data for an initial pool of jurors and juror pre-liability-deliberation response data resulting from questioning of the initial pool after the liability portion of the case has been presented and before deliberation of the liability portion;
  configuring a client computer to determine whether each of the jurors is plaintiff-oriented or defendant-oriented based on analysis of the results of the pre-liability-deliberation questioning; and
  configuring the client computer to define at least one research jury composed of members of the initial pool of jurors, the at least one research jury having at least one defendant-oriented juror and having more plaintiff-oriented jurors than defendant-oriented jurors.

26. The computer-readable medium of claim 25, wherein the configuring the client computer to determine whether each juror is plaintiff-oriented or defendant-oriented comprises computer analysis of the juror pre-liability-deliberation response data.

27. The computer-readable medium of claim 25, wherein the configuring the client computer to determine whether each juror is plaintiff-oriented or defendant-oriented comprises presentation by the client computer of the juror pre-liability-deliberation response data to a user.

28. The computer-readable medium of claim 25, wherein the configuring the client computer to define the at least one research jury comprises computer selection of research jury members using predetermined criteria.

29. The computer-readable medium of claim 25, wherein the configuring the client computer to define the at least one research jury comprises selection of research jury members by a user.

* * * * *